United States Patent [19]

Tanaka

[11] 4,402,638
[45] Sep. 6, 1983

[54] BLIND RIVET

[75] Inventor: Toshie Tanaka, Machida, Japan

[73] Assignee: Nifco Inc., Tokyo, Japan

[21] Appl. No.: 284,270

[22] Filed: Jul. 17, 1981

Related U.S. Application Data

[63] Continuation of Ser. No. 12,981, Feb. 21, 1979, abandoned.

[30] Foreign Application Priority Data

Feb. 24, 1978 [JP] Japan ................ 53-22294[U]

[51] Int. Cl.³ .......................................... F16B 13/04
[52] U.S. Cl. ........................................ 411/34; 411/70
[58] Field of Search ................. 24/73 A, 73 P, 73 D, 24/73 PF, 73 SM; 411/34, 38, 36, 43, 70

[56] References Cited

U.S. PATENT DOCUMENTS

| Re. 20,055 | 8/1936 | Huck | 411/34 X |
|---|---|---|---|
| 2,324,142 | 7/1943 | Eklund | 411/38 X |
| 3,438,301 | 4/1969 | Mattioli | 411/34 |
| 4,222,304 | 9/1980 | Yoshida et al. | 411/34 |

FOREIGN PATENT DOCUMENTS

| 2625023 | 12/1976 | Fed. Rep. of Germany | 411/34 |
|---|---|---|---|
| 878521 | 10/1942 | France | 411/35 |
| 2302442 | 9/1976 | France | 411/34 |

Primary Examiner—William E. Lyddane
Attorney, Agent, or Firm—Thomas W. Buckman; Jack R. Halvorsen

[57] ABSTRACT

Disclosed is a blind rivet comprising a shank provided with a series of engaging teeth and a lower end having an increased diameter and a rivet body disposed around the shank and provided with a series of lock steps formed so as to correspond to the series of engaging teeth on the shank, a head portion to close one edge of the fitting hole of a panel subjected to rivetting and a lower end substantially joined to the lower end of the shank, whereby desired firm rivetting of the panel is accomplished by inserting the rivet body accommodating the shank into the hole of the panel and moving upwardly the shank for thereby causing the enclosing wall portion of the rivet body to be eventually bent inwardly and doubled up to expand radially the rivet body.

4 Claims, 19 Drawing Figures

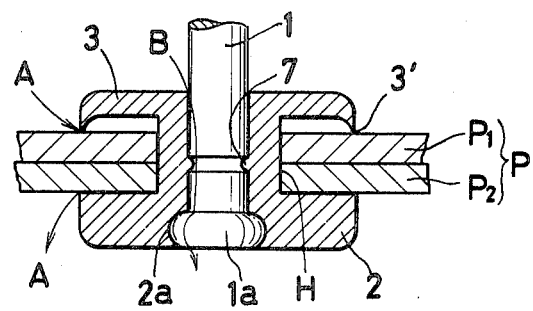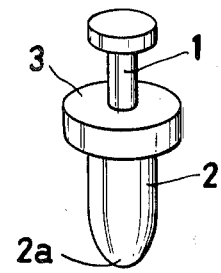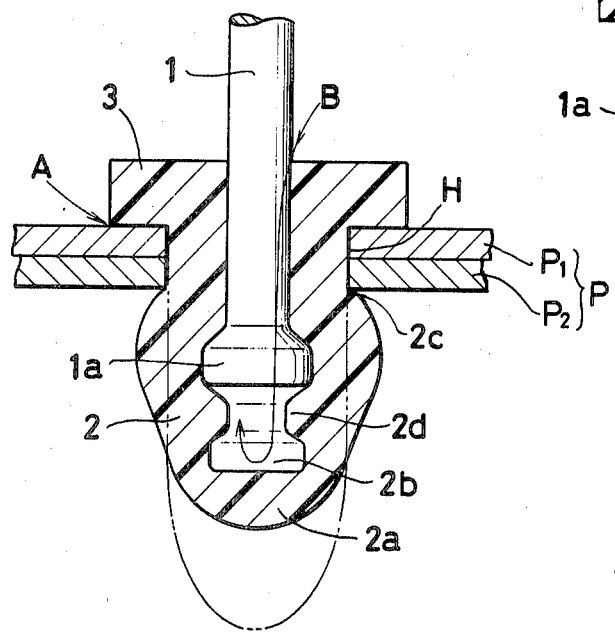

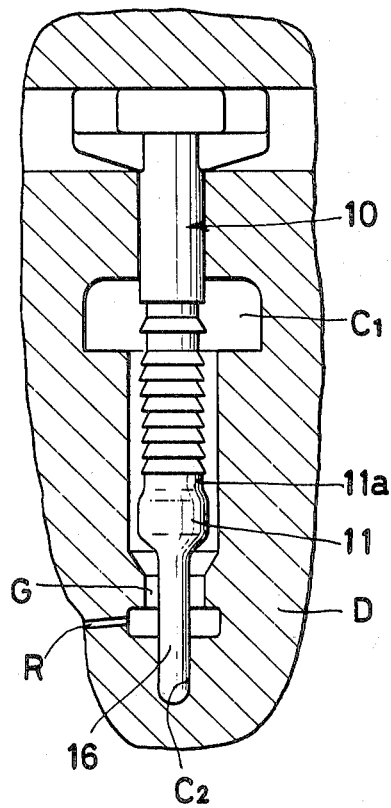
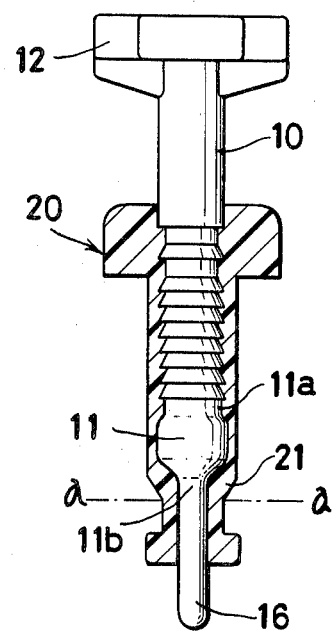
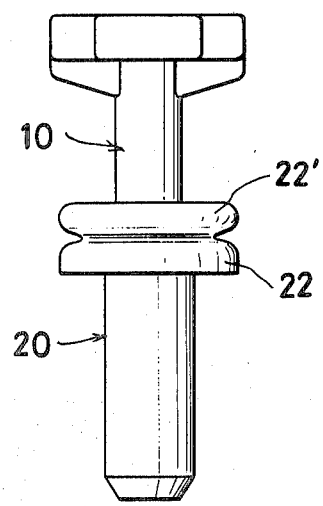

4,402,638

BLIND RIVET

This is a continuation of application Ser. No. 12,981, filed Feb. 21, 1979, now abandoned.

BACKGROUND OF THE INVENTION

This invention relates to a blind rivet designed specifically to provide improved water tightness and enhanced binding force, which when operated on from only one side, functions as a fastener for tight union of a plurality of plate-shaped parts or for allowing a part to be attached fast to another part to which the blind rivet has already been secured in position.

The common blind rivet is basically composed of a shank and a rivet body which is formed around the shank by a two-stage plastic molding technique. The blind rivet is inserted into the hole bored in a part such as a panel until the flange head portion of the rivet body comes into contact with the frontal surface of the panel and the shank alone is moved upwardly with a specially designed tool. Consequently, the rivet body is bent and folded outwardly to allow the panel to be squeezed.

The inventor has previously proposed improved blind rivets (U.S. Pat. No. 4,222,304 issued Sept. 16, 1980 and U.S. Ser. No. 941,777 filed Sept. 13, 1978), both of which are owned by the common assignee of the present matter. The blind rivet constructed as described above is designed to provide the rivet body with windows opened in the longitudinal direction thereof so as to facilitate the outward bending and folding of the rivet body. This blind rivet is superior to other blind rivets in binding force obtained thereby and a binding operation, but, like the conventional blind rivets, does not enjoy high water tightness.

An object of the present invention is to provide a blind rivet of a plastic material, which shows greater tolerance for variations in the thickness of the panel and the diameter of the hole in the panel with which it is used, enhances the engaging or binding force exerted upon the panel and ensures high water tightness.

SUMMARY OF THE INVENTION

To accomplish the object described above according to the present invention, there is provided a blind rivet which comprises a shank provided with a series of engaging teeth and an expanded lower end, a rivet body provided with a series of lock steps adapted to be meshed with the engaging teeth on the shank and a lower end substantially joined to the lower end of the shank, whereby an action exerted to pull the shank upwardly causes the lower portion of the encircling wall section of the rivet body to be folded into the interior of the upper portion thereof. Assuming the blind rivet is beforehand inserted into a hole in a part subjected to rivetting such as a panel until the flange is pressed against one side of the panel, the rivet body is inwardly bent and closely doubled up on the other side of the panel by pulling upwardly the shaft, thereby enabling the interior of the rivet body to form a substantially blind vacant cavity to ensure water tightness of the rivet at the time the rivet is brought into its bound state, allowing the rivet body to be uniformly expanded radially so much as to enhance the engaging or binding force exerted upon the fitting hole, the plate-shaped material containing the fitting hole or some other part subjected to rivetting, giving an ample radius to the expanded shank relative to the distance for the upward movement of the shank, providing greater tolerance for variations in the diameter of the fitting hole and the thickness of the panel, permitting the rivet to assume a sufficiently shortened length upon completion of the binding as compared with the length in the normal state and, at the same time, make full use of the resilient deformation of the rivet body due to the plasticity of its material in keeping the shank in its lifted position and preventing it from returning to its original position, and enhancing and assuring the engaging force exerted after the rivet is brought into its bound state.

The other objects and characteristic features of the present invention will become apparent from the description to be given in full detail with reference to the accompanying drawings.

BRIEF DESCRIPTION OF THE DRAWINGS

FIGS. 2A and 2B are longitudinally sectioned views of a second conventional blind rivet, illustrating the rivet in states before and after being deformed.

FIGS. 3A, 3B and 3C are respectively, a perspective view and a longitudinal sectioned view of a third conventional blind rivet in its normal state and a longitudinally section view of the rivet in service.

FIG. 5A is a front view of a second preferred embodiment of the present invention and a second molding die.

FIG. 5B is a longitudinally sectioned view of the blind rivet molded by the die of FIG. 5A.

FIG. 6 is a front view of a third preferred embodiment of the blind rivet of the present invention.

DETAILED DESCRIPTION OF THE INVENTION

Figure 1A:
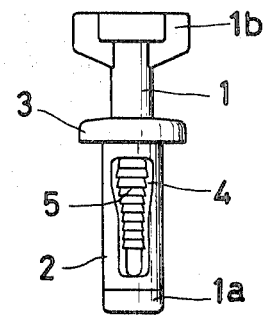
FIGS. 1A, 1B and 1C are respectively a front view, a side view and a longitudinal sectioned view of a first conventional blind rivet.

This invention relates to a blind rivet comprising a shank and a rivet body disposed around the shank, which enjoys fast engagement with a part subjected to rivetting such as a panel by moving upwardly the shank in relation to the rivet body.

Blind rivets of this kind have heretofore been developed in a wide variety of designs. This inventor has previously proposed a blind rivet having superior features and a description will first be made of this earlier blind rivet with reference to FIGS. 1A–1C.

This prior art blind rivet comprises a shank 1, a cylindrical rivet body 2 formed around the shank 1 by two-stage molding, the lower end of the rivet body 2 adapted to remain in contact with the expanded portion 1a at the lower end of the shank 1, a flange 3 provided at the upper end of the rivet body 2, and windows 4 opened in the enclosing wall in the longitudinal direction of the rivet body. The shank 1 is provided over a suitable length thereof in the longitudinal direction with a series of engaging teeth 5 at a position corresponding to the interior of the rivet body. This blind rivet is inserted in the direction of the lower end of the shank through a hole H perforated in a panel P (on the assumption that the rivet is being used for joining two panels $P_1$ and $P_2$) as a part subjected to rivetting as illustrated in FIG. 1C until the flange 3 comes into tight contact with the frontal surface of the panel. Then the shank 1 alone is moved upwardly with a specially designed tool so as to fit perfectly around the head portion 1b of the shank 1. Consequently, the rivet body 1, because of the presence of the windows 4, is bent and folded outwardly under the force resulting from the upward movement of the expanded portion 1a of the shank. Eventually, the wall of the rivet body is expanded behind the panel P, causing the panel P to be squeezed between the flange 3 and the folded wall of the rivet body. After the blind rivet has been bound to the panel as described above, the unnecessary protruding portion of the shank 1 is cut off. Once the bound state is assumed, one corresponding tooth in the series of engaging teeth 5 formed on the shank snaps into engagement unreturnably with a lock step 6, which engagement is retained after the upward movement of the shank is stoppped. Even after this bound state is assumed, the blind rivet manifests resilience because of the elasticity originating in the plastic property of the material of which the rivet is made. This resilience is converted into a force which serves to press the tooth of the series of engaging teeth 5 more powerfully against the lock step 6, enabling the binding force of the blind rivet to be at all times maintained at a slightly higher degree than is needed. If the diameter of the hole H and the overall thickness of the panel P are varied to a considerable extent, the extent to which the rivet body 2 is bent and folded outwardly is correspondingly varied enough to absorb their variations.

Figure 1B:
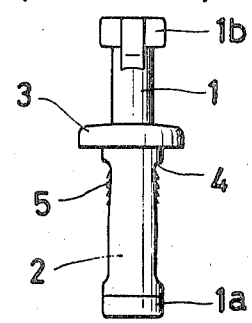
Figure 1C:
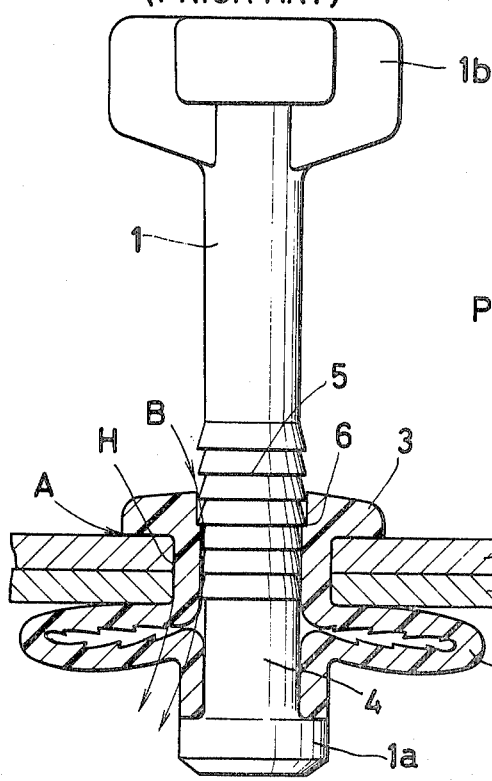

Since the plastic blind rivet illustrated in FIGS. 1A-1C possesses an excellent basic function, various modifications have been proposed thereto. For example, it has been proposed to modify the flange 3 into a T-shaped stud or to add a slight protuberance to the top of the flange 3 so that the rivet may be used as a fastener for the window molding in an automobile. While the rivet is excellent in the sense mentioned above, it nevertheless has a disadvantage that it cannot withstand a use which specifically calls for water tightness. As is understood from FIG. 1C, the water tightness along the route extending, as indicated by the arrow A, from the outer surface of the flange 3 through the interface between the inner wall of the hole H and the peripheral surface of the rivet body to the other side of the panel may possibly be improved to some extent by forming the flange 3 in the shape of a suction disc or giving some other suitable modification to the flange. The blind rivet, however, cannot retain sufficient water tightness along the route which extends (as indicated by the arrow B) through the intervening space between the peripheral surface of the shank 1 and the inner wall surface of the rivet body 2 to the window 4 which is opened particularly widely after the rivet has assumed the bound state.

Figure 2A:
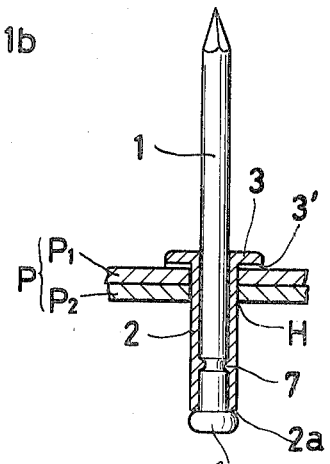

A type which avoids the inclusion of windows 4 which cause the problem of inferior water tightness is found in the known metallic rivet having the construction of FIGS. 2A and 2B. To be specific, this rivet comprises a shank 1 made of a metallic material and a rivet body 2 completely closed throughout the entire circumference made of a metallic material and adapted to contain therein the shank 1, the shank 1 having the lower end thereof formed in the shape of an expanded portion 1a and the rivet body 2 being provided at the upper end thereof with a flange 3 containing along the periphery thereof an annular protuberance 3' which serves the purpose of uniformly distributing the force exerted upon the flange 3 during the upward movement of the shank 1, whereby an upward movement of the shank 1 causes the rivet body 2 to be deformed and collapsed as illustrated in FIG. 2B and consequently enables the panel P to be squeezed between the collapsed rivet body and the flange 3. After the rivet is bound tightly with the panel, the shank 1 is torn off by being further moved upwardly. For the purpose of imparting to the shank a constriction intended to facilitate the breakage, projections 7 are formed inside the rivet body However, the water tightness actually obtained by the rivet is nearly the same as that of the rivet shown in FIGS. 1A-1C. Namely, a metallic rivet which does not offer any appreciable amount of resilience is not capable of tightly closing the gap between the peripheral edge of the hole and the shank and consequently, does not enjoy complete water tightness in the routes A and B. The binding force exerted upon the panel P by the metallic rivet is limited to the force with which the panel P is squeezed from above and below. Once the upward movement of the shank is stopped, the rivet is absolutely incapable of adding to the binding force because of the absence of resilient engagement between the engaging tooth and the lock step. Thus, the rivet is farily susceptible to loosening of the established engagement under an external influence such as vibration.

On the other hand, the third conventional plastic rivet which is of the construction illustrated in FIGS. 3A-3C enjoys almost perfect water tightness.

Again in this rivet, the shank 1 is completely surrounded with the rivet body 2 and the expanded portion 1a at the lower end of the shank is radially expanded. The salient feature of this rivet resides in the fact that the lower end 2a of the rivet body 2 is closed unlike the aforementioned conventional types, in addition to the fact that the rivet body 2 is completely closed throughout the entire circumference thereof. When the flange 3 is pressed against one side of the hole H bored in the panel P and the shank 1 is moved upwardly, the expanded portion 1a rises and leaves a vacant cavity 2b where it was formerly positioned and, at the same time, expands radially the portion of the rivet body which was held in intimate contact with the peripheral surface of the shank 1 and had a relatively smaller diameter. Consequently, the rivet body is plastically deformed and expanded radially throughout the entire circumference and this radial expansion of the rivet body continues upwardly (FIG. 3C).

The opposite edges of the hole H, accordingly, are closed by the flange 3 and the expanded portion 2c of the rivet body so as to close the route A extending from the outer surface of the flange 3 to the inner wall surface of the hole. The route B which extends from the peripheral surface of the shank to the interior of the rivet body does not permit free passage of a liquid between the opposite sides of the panel because the rivet body has a blind bottom portion 2a. In terms of water tightness, therefore, this rivet is quite satisfactory. However, the rivet enjoys this advantage at a small yet inevitable sacrifice of the fundamental function of exerting a binding force upon the panel P.

At the time that the binding of the rivet to the panel is completed as illustrated in FIG. 3C, the leading end 1a of the shank is stopped in position by the constriction 2d formed inside the rivet body below the leading end 1a. Thus, the possibility of the shank slipping off the rivet body as experienced by the second conventional rivet is remote, though not perfectly absent as in the first conventional rivet.

The blind rivet according to the present invention is also composed of a shank 10 and a rivet body 20 as illustrated in FIGS. 4A–4E. For the convenience of the molding and also for ensuring functional unification of the lower end 11 of the shank and the lower end 21 of the rivet body as described later, the blind rivet is desirably molded of synthetic resin by a two-stage molding technique.

The upper end of the shank molded in the first die forms a head portion 12 of a shape conforming with a fitting tool formerly developed for use with blind rivets of this kind. From this head portion, a cylindrical portion hangs down to a suitable length, then continues into a series of engaging teeth 13 of a slightly decreased diameter, again extends into a cylindrical portion 14 and finally terminates in the lower end 11 of the shank having an increased diameter.

The rivet body 20 is formed in the second die by injection molding so as to enclose therewith the shank 10 of the construction described above. In this case, with a view to facilitating the positioning of the shank within the cavity of the second die, four ribs 15 are formed on the peripheral surface of the lower end 11.

The rivet body 20 thus molded in the second die is provided at the upper end thereof with a head portion 22 which is adapted to close one edge of the fitting hole H in the panel P upon contact with the same side of the panel and which has the shape of a flange in the present case. The enclosing wall surface 23 of the rivet body which extends in the direction of the lower end 11 is totally closed throughout the entire circumference. Further in the present case, even the tip portion of the lower end 21 which is positioned below the lower end 11 of the shank is closed so as to give the rivet body a blind bottom.

The lower shoulder surfaces formed in the cylindrical portion which extend downwardly from the head portion 12 of the shank help the interior of the rivet body to form lock steps 24 containing upper shoulder surfaces. At the same time, on the inner wall surface of the rivet body, a series of complementary engaging steps 25 are formed so as to correspond to the series of engaging teeth 13 formed on the shank.

Figures 4A, 4B, 4C:
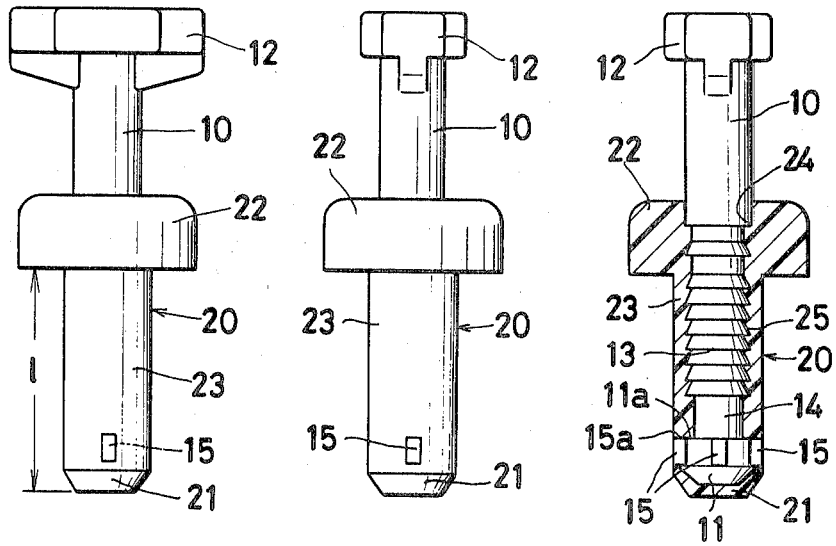
FIGS. 4A, 4B and 4C are respectively a front view, a side view and a longitudinally sectioned view of a preferred embodiment of the blind rivet according to the present invention.
Figure 4D:
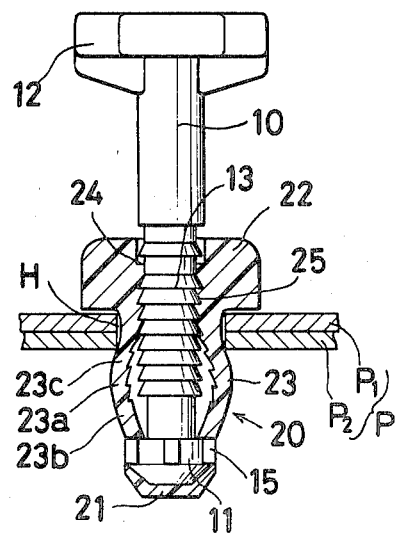
FIGS. 4D and 4E are longitudinally sectioned views of the blind rivet of FIGS. 4A–4C in the process of transition from its normal state to a state of service.
Figure 4E:
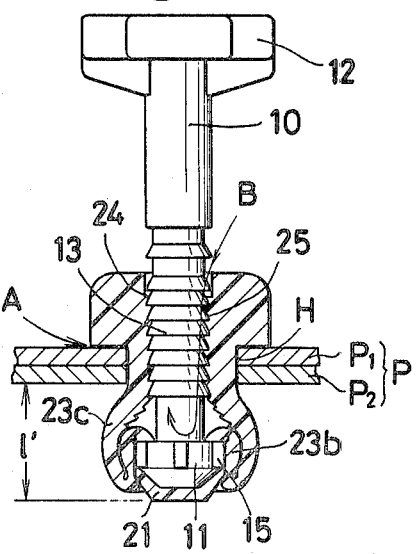

First, the rivet is inserted in the direction of the lower end of the rivet body into the fitting hole as illustrated in FIG. 4D. Then, the head portion 22 of the rivet body is pressed down against the panel P and, at the same time, the shank 10 is moved upwardly. Actually in this case, the upward movement of the shank is facilitated by using a special tool (not shown) designed exclusively for this purpose. Of course, some other suitable tool may be used instead of the special tool. Where use of this special tool is not contemplated, the head portion 12 of the shank may be formed in a simple shape of a disc or a rod, for example. In any case, in consequence of the upward movement of the shank, the rivet body 20 which is fastened to the lower end of the shank is subjected to an upward force exerted from below. As the upward force builds up, the rivet body 20 contracts lengthwise and expands radially as illustrated in FIG. 4D. As the upward movement of the shank is further continued, the force with which the rivet body tends to expand radially is converted, by virtue of the compressive force the lower end 11 of the shank exerts upon the rivet body, into a force which tends to cause the portion 23b immediately underlying the portion 23a which has theretofore been expanded to the greatest extent to be folded into the vacant cavity lying underneath the uppermost portion 23c. As a result, the lower portion 23b of the enclosing wall portion 23 of the rivet body is turned around the point at which the lower portion 23b is secured to the lower end 11 of the shank and eventually bent inwardly in the neighborhood of the most expanded portion 23a and continuously folded and doubled up inside the uppermost portion 23c of the enclosing wall as illustrated in FIG. 4E. From the standpoint of the uppermost portion 23c of the enclosing wall which admits the aforementioned insertion of the lower portion 23b, this uppermost portion 23c is forcibly expanded by a radial distance equivalent to the thickness of the lower portion 23b. In the present preferred embodiment, therefore, the increase in the diameter for the distance of the upward movement of the shank is far greater than in the third conventional rivet of FIG. 3 wherein the increase in the diameter depends solely upon the greater diameter of the expanded lower end of the shank. Because of the notably increased diameter of the rivet body, the rivet body is brought into tight contact with the entire lower edge of the fitting hole H. At the same time, the portion of the enclosing wall which is present inside the fitting hole H is consequently caused to contract lengthwise, with the result that the head portion 22 of the rivet body is pressed with increased force against the surface of the panel. Since the head portion 22 seals one side of the fitting hole and the radially expanded lower end of the rivet body seals the other side of the fitting hole, the water tightness of the rivet along the aforementioned route A is complete and the force with which the panel P is held therebetween is enhanced. Further since the portion of the rivet body still present inside the fitting hole H assumes a force tending to expand radially the enclosing wall into intimate contact with the inner wall surface of the hole, it supplementarily functions to add both to the binding force and the water tightness.

Owing to the construction described above, the degree to which the rivet body 20 enjoys freedom of radial expansion is considerably large. This freedom is not affected by such factors as the diameter of the fitting hole and the thickness of the panel. Thus, the blind rivet of the present preferred embodiment enjoys great flexibility of operation. Further, the rivet length l' which protrudes from the lower side of the panel after the rivet has assumed its bound state as shown in FIG. 4E is decisively small as compared with the normal length l shown in FIG. 4A because the rivet body 20 is separated and doubled up. Thus, the protruding remainder of the rivet body offers no particular obstruction. After the rivet has assumed the bound state, the unnecessary protruding portion of the shank 10 may be removed or otherwise disposed of as occasion demands.

After the binding force thus exerted on the panel P has increased sufficiently, the upward movement of the shank is stopped. Consequently, the one of the series of engaging teeth 13 that has just slid past the lock step 24 inside the rivet body is brought into fast engagement with the lock step 24 or a series of lock steps 25 to complete the binding. The rivet body which deforms by virtue of resilience embraces a force in the direction of restoration even after the rivet has assumed the bound state as shown in FIG. 4E. This force rather serves the purpose of enhancing the supplementary force of engagement exerted between the series of engaging teeth 13 and the lock step 24 or the series of lock steps 25. Thus, the union of the rivet to the panel P will not be loosened by external vibration or external impact.

One of the requirements indispensable to the present invention is satisfied so long as the lower end of the shank and the lower end of the rivet body are bound and unified at least functionally so fast as not to be separated from each other under any condition from the time the rivet is formed by molding till the time the rivet is bound with the panel P. In this sense, the union between the lower end of the shank and the lower end of the rivet body need not be limited to that of the illustrated preferred embodiment but may be formed in the shape of a simple rod in which the lower end 11 of the shank is destitute of shoulder surfaces (and, therefore, is not expanded). The number of ribs is purely a matter left for free choice and it is evident that the shape of the rivet body at the bottom changes to a triangle when there are three ribs, to a pentagon where there are five ribs, and so on.

Naturally the shank 10 may be molded in the first die without incorporation of ribs and this shank can be set in position without any special difficulty within the cavity of the second die. For example, this is accomplished by causing a positioning rod 16 further extended from the leading end 11 of the shank as illustrated in FIGS. 5A–5B to be molded integrally with the shank at the time that the shank 10 is molded in the first die (not shown). In the second die D, a cavity $C_2$ for the positioning rod 16 is provided in addition to a cavity $C_1$ for the rivet body, so that the positioning rod 16 integrally molded with the shank may be received in the cavity $C_2$. Then, by allowing the molten resin to be injected through the runner R and the gate G into the cavities of the second die, a complete rivet as shown in FIG. 5B is obtained. In this case, the portion of the rivet protruding downwardly from the lower end 21 of the rivet body has served its sole purpose of keeping the shank in position in the second die and is no longer needed. Thus the unnecessary portion including the positioning rod 16 may be cut off the rest of the rivet along the line $\alpha$—$\alpha$ indicated in the drawing.

In the present preferred embodiment, the lower end 21 of the rivet body has no physical bottom but the bottom 11b at the leading end of the shank concurrently serves as a bottom for the rivet body. As already described, the rivet of this invention has the lower end of the shank and the lower end of the rivet body fused together as by leaving the relevant portions uncoated with the mold-release agent. In the preferred embodiment illustrated in FIG. 5A–FIG. 5B, although the shoulder surfaces 11a are smoothly sloped down and the shank is provided with no ribs, the aforementioned requirement is fulfilled by adjusting the wall thickness of the rivet body 20. It is added that the rivet of this preferred embodiment, when actually put to use, fulfilled its function advantageously until the final bound state was assumed as illustrated in FIG. 4E and that the water tightness of the rivet along the route B or the substantial imperviousness of the rivet body 20 to liquid was safely retained.

As described with reference to various preferred embodiments with the aid of illustrations, where the panel P consists of two component parts $P_1$, $P_2$, the rivet of the present invention serves to join these two component parts $P_1$ and $P_2$ so fast as to ensure water tightness along the fitting hole bored in each part. The rivet is, of course, capable of uniting more than two plate-like articles or other parts.

Figure 7:
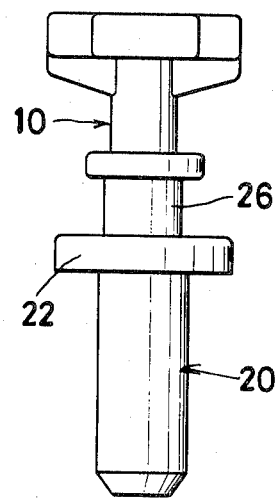
FIG. 7 is a front view of a fourth preferred embodiment of this invention.
Figure 8:
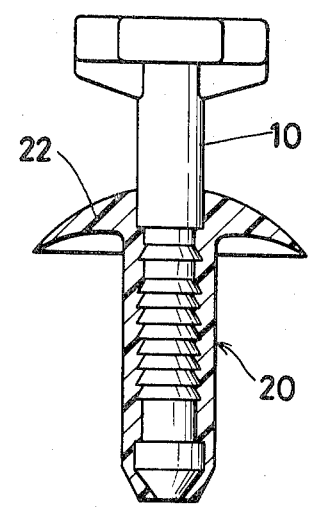
FIG. 8 is a longitudinally sectioned view of a fifth preferred embodiment of the present invention.
Figure 9:
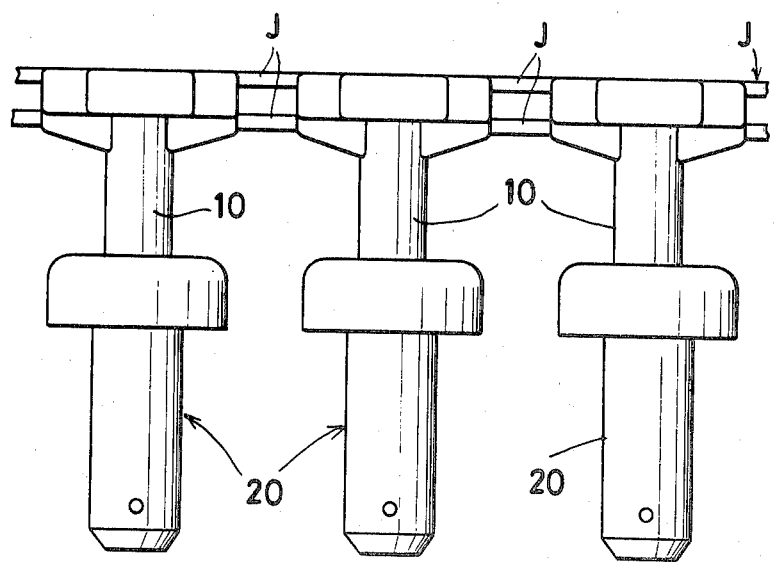
FIG. 9 is a front view of a part of a sixth preferred embodiment of this invention wherein a plurality of connected successively rivets are simultaneously molded.

Separately of the preferred embodiment described above, when the head portion of the rivet body is molded so as to incorporate therein suitable means adapted to permit attachment of a given article, the rivet can be used additionally for the purpose of attachment of such an article. If the head portion 22 of the rivet body is formed in the shape of a disc containing a constriction in the circumference as illustrated in FIG. 6, for example, the upper half of the disc 22' may be used for keeping in position the window molding in an automobile. The head portion 22 may be provided with a T-shaped stud 26 as illustrated in FIG. 7. If the head portion 22 of the rivet body is molded in the shape of a suction disc as illustrated in FIG. 8, the rivet enjoys further improved water tightness. Although various preferred embodiments have been illustrated each as an independent rivet, it is advantageous from the practical point of view to mold a number of rivets connected serially side by side through the medium of thin joining means J as when use of a specially designed tool is contemplated. Rivets connected in this manner are illustrated in FIG. 9. After completion of the simultaneous molding of the rivets, tearing the individual rivets off at the joining means J one by one at the time of actual use.

In each of the preferred embodiments dealt with above, the shank 10 and the rivet body 20 have been described each as possessing a cylindrical shape, the shank in particular may possess a rectangular or some other suitable cross section. Also the rivet body 20 may similarly possess a rectangular or other suitable cross section.

Finally, in the practical test wherein various rivets bound to a panel P were exposed to a continuous shower of water controlled so as to wet the rivets only on one side of the part to determine how much water would leak through the rivets, the rivets of the present invention showed decisively higher degrees of water tightness than the conventional countertypes illustrated in FIGS. 1–3. As a natural consequence, they protect metal parts from rust much better in prolonged use than the conventional rivets as may be reasonably expected. Further, since the rivets of this invention are very strong against external impacts as already pointed out and enjoy high water tightness, they prove to be particularly suitable as devices for fastening outer covering plates such as decorative sheets and windshields to automobile bodies.

In summary, as described in detail above, the blind rivets of the present invention are perfectly free from all the drawbacks suffered by the conventional rivets. They offer perfect water tightness and enhance, rather than impair, the binding force to be exerted upon the part subjected to rivetting. Further, they provide greater tolerance for variations such as in the diameter of the fitting hole and the plate thickness in the neighborhood of the fitting hole. Moreover, they are amply contracted in size at the time they are bound to the part so as to improve the space factor. Because of these excellent effects, they enjoy high practical utility.

What is claimed is:

1. A blind rivet made of synthetic resin, which comprises a shank provided with a series of engaging teeth at the outer periphery thereof and with an expanded lower end and a laterally extending pulling head at the opposite upper end, an insert molded continuous rivet body disposed around said shank provided with a resilient continuous enclosing wall surface having a substantially uniform external diameter and in the interior thereof a series of complimentary lock steps adapted to be intimately meshed with said engaging teeth on the shank, a flange-shaped head portion extending laterally from said body adjacent said pulling head and serving to cover one open edge of a complimentary fitting hole bored in a panel subjected to riveting, said rivet body including a lower portion being inseparably joined in a sealing manner with said expanded lower end of the shank, said lower portion having shoulder means substantially larger in diameter than the diameter of the axially adjacent portion of said shank but smaller than the outer diameter of said rivet body and at least three projections extending radially outwardly from said lower portion a distance substantially equal to the outer diameter of said rivet for centering said lower portion during its insert molding within said rivet body thereby centralizing the positionment of said lower portion relative to said rivet body and insuring a generally uniform wall thickness in said continuous enclosing wall, whereby a simultaneous action exerted to press said head portion of the rivet body down against the panel and to pull the shank upwardly relative to the panel results in a substantially uniform force being exerted against the entire circumference of the continuous rivet body wall which causes the enclosing wall surface of the rivet body to be inverted within itself due to its resilience to be thereby folded and doubled up and consequently force the continuous enclosing wall surface to bulge out and catch firm hold of the lower edge of the fitting hole to form a seal about the periphery of said hole, said lower portion of said shank being capable of being drawn axially upwardly within said rivet body until it is substantially totally surrounded by said doubled up wall, whereby said complimentary fitting hole is substantially sealed by said blind rivet sealing around the exterior thereof with said hole and said rivet being sealed internally, and disengagement of said blind rivet when said rivet is in a sealing condition relative to said fitting hole is precluded by the engagement of at least one of said engaging teeth with at least one of said locking steps.

2. A blind rivet according to claim 1, wherein said shank is provided at the upper end thereof with a head portion of a shape conforming with a specially designed tool.

3. A blind rivet according to claim 1, wherein said head portion of the rivet body is molded so as to incorporate therein suitable means adapted to permit attachment of a given article.

4. A blind rivet according to claim 1, wherein said head portion of rivet body is molded in the shape of a resilient sealing member tapered toward its edges to seal against the surface around the fitting hole opposite the seal by the expanded wall surface.

* * * * *